United States Patent [19]

Ross

[11] Patent Number: 4,791,659

[45] Date of Patent: Dec. 13, 1988

[54] REMOTE TEST TELEPHONE LINE ACCESS SYSTEM

[75] Inventor: Alan Ross, Plainview, N.Y.

[73] Assignee: Domain Systems, Inc., East Farmingdale, N.Y.

[21] Appl. No.: 925,712

[22] Filed: Oct. 30, 1986

[51] Int. Cl.⁴ ............................................ H04M 1/24
[52] U.S. Cl. ....................................... 379/22; 379/29
[58] Field of Search .................... 379/5, 22, 29, 26; 370/13, 14, 15; 371/22

[56] References Cited

U.S. PATENT DOCUMENTS

| | | | |
|---|---|---|---|
| 3,899,738 | 8/1975 | Harzer | 379/5 |
| 3,910,322 | 10/1975 | Hardesty, Jr. et al. | 371/15 |
| 4,059,729 | 11/1977 | Eddy et al. | 370/15 |
| 4,090,035 | 5/1978 | Popkin | 370/15 |
| 4,110,572 | 8/1978 | Cochrane | 379/26 |
| 4,112,264 | 9/1978 | Abramson et al. | 371/22 |
| 4,393,492 | 7/1983 | Bishop | 370/15 |
| 4,402,075 | 8/1983 | Bargeton et al. | 370/15 |
| 4,455,644 | 6/1984 | Fox et al. | 379/22 |
| 4,529,979 | 7/1985 | Kusama et al. | 379/5 |
| 4,569,042 | 2/1986 | Larson | 370/13 |
| 4,577,309 | 3/1986 | Barazeche et al. | 370/13 |
| 4,601,028 | 7/1986 | Huffman et al. | 370/15 |

FOREIGN PATENT DOCUMENTS 0047590 3/1982 European Pat. Off. ................ 379/5

Primary Examiner—Stafford D. Schreyer
Attorney, Agent, or Firm—Bryan, Cave, McPheeters & McRoberts

[57] ABSTRACT

An improved remote test access system (100) for remotely testing an accessed telephone line (T/R) with any conventional telephone test set (102) without introducing any errors or hits to the line (T/R), uses a fixed reference delay (110, 112) which is always in the signal path and a variable delay (120, 122) which is in the test path and is varied so that the sum of the variable delay (120, 122) and the test set (102) delay equals the fixed reference delay (110, 112).

16 Claims, 17 Drawing Sheets

REMOTE TEST TELEPHONE LINE ACCESS SYSTEM

TECHNICAL FIELD

The present invention relates to remote test access systems for remotely testing an accessed telephone line and particularly to improvements in such systems which permit a test set to be inserted into an accessed telephone line without interrupting the timing on the telephone line for providing errorless testing, such as no hits or disturbances, on the telephone line.

BACKGROUND ART

Remote test telephone line access systems are well known in the art. One of the problems with prior art remote test telephone line access systems, however, is being able to test the telephone line, either through monitor access or split access, without causing disturbances to other customers on the line. Such disturbances, which can occur when the conventional test set is inserted into the line for the remote test of the line, are not only annoying, but in the case of digital remote test access systems, can introduce undesired significant bit error on the accessed telephone line. In an effort to avoid these problems, special test sets have been built dedicated to a particular remote test access system. Such an arrangement, however, is costly, and does not enable telephone companies to take advantage of already existing, conventional test sets which are commercially available at considerably less cost than required to build a new dedicated test set. Such conventional prior art test test arrangements are described in U.S. Pat. Nos. 3,047,841; 3,912,884; 4,538,033; 4,489,220; 4,562,313; 3,845,247; 3,870,836; 3,928,803; 4,054,760; 3,821,495; 3,769,454; 3,549,816; 3,363,064; 3,084,231; and 3,872,266. None of these prior art arrangements, however, utilize a variable delay to delay the test signal for enabling an errorless match between any of a plurality of different test sets and the accessed telephone line to permit errorless testing nor do they controllably make the delay between the test path equivalent to the delay of the normal signal path. Thus, if different prior art test sets having different associated delays are inserted into a given telephone line errors will be introduced due to the resultant interruptions in the timing on the telephone line. These disadvantages of the prior art are overcome by the present invention.

BEST MODE FOR CARRYING OUT THE INVENTION

Figure 1:
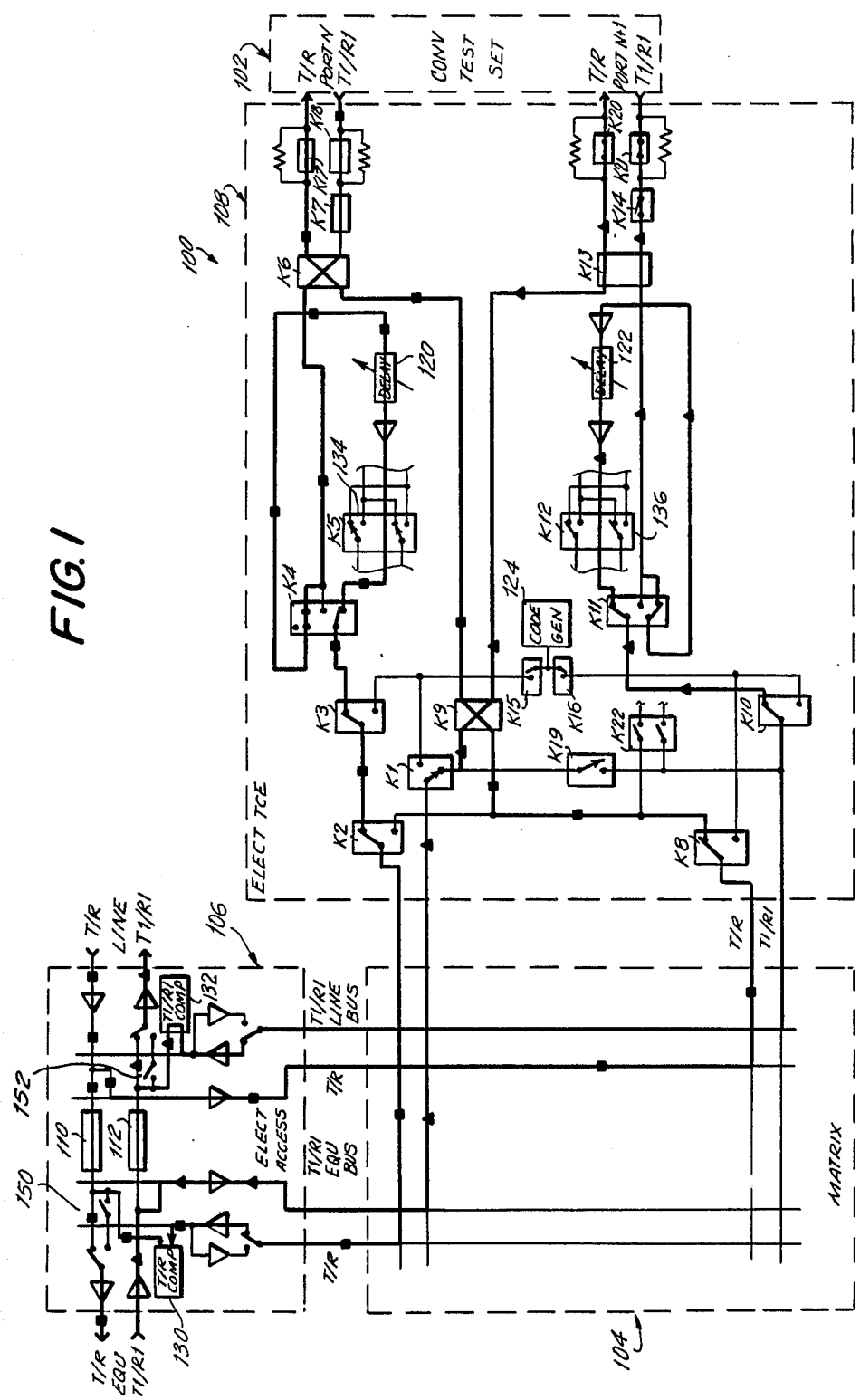
FIG. 1 is a functional block diagram, partially in schematic, of the presently preferred improved remote test telephone line access system, illustrating the signal flow during the synchronization function of the system.
Figure 2:
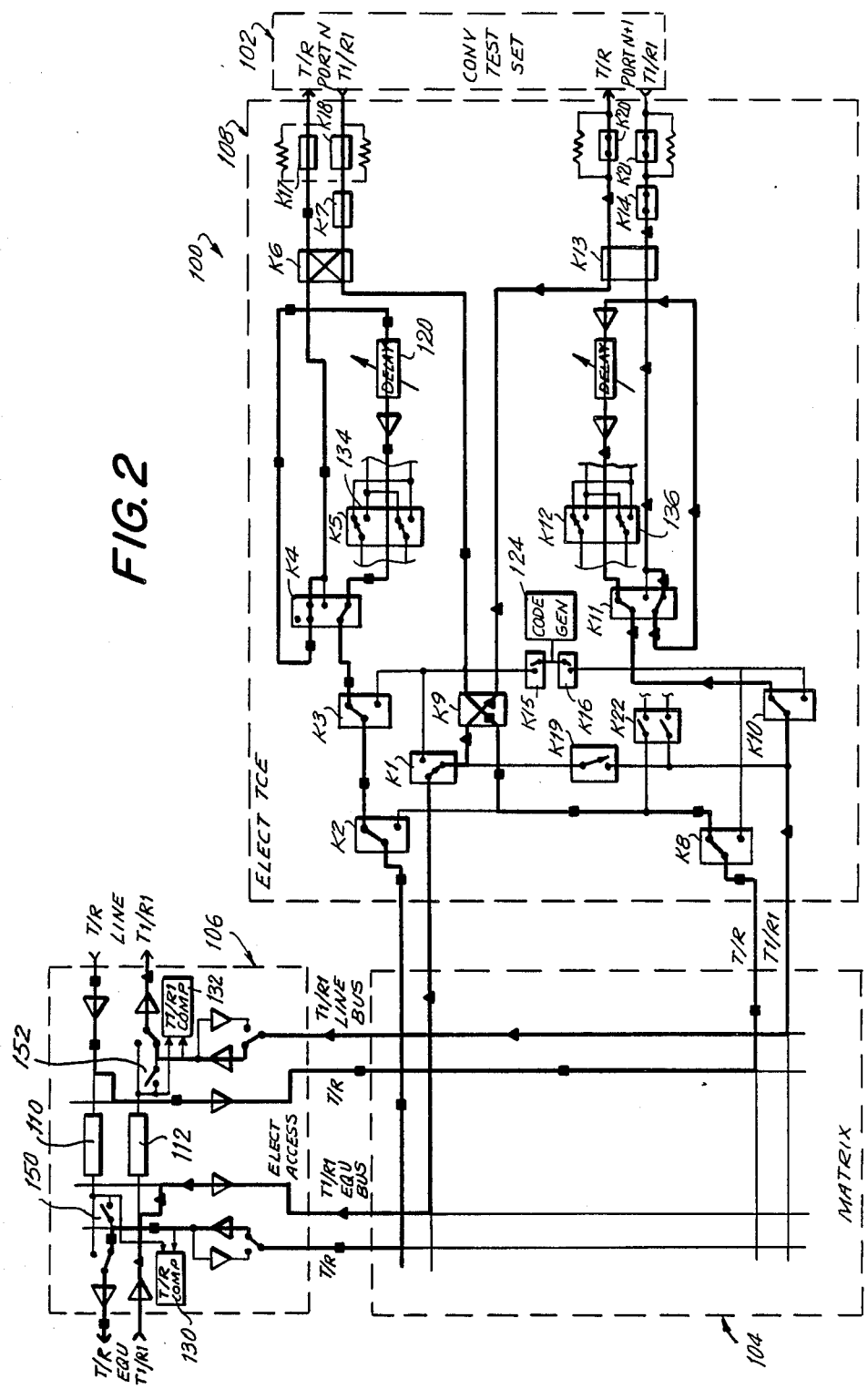
FIG. 2 is a functional block diagram, partially in schematic, similar to FIG. 1, of the presently preferred improved remote test telephone line access system, illustrating the signal flow during the actual test function of the system.
Figure 3:
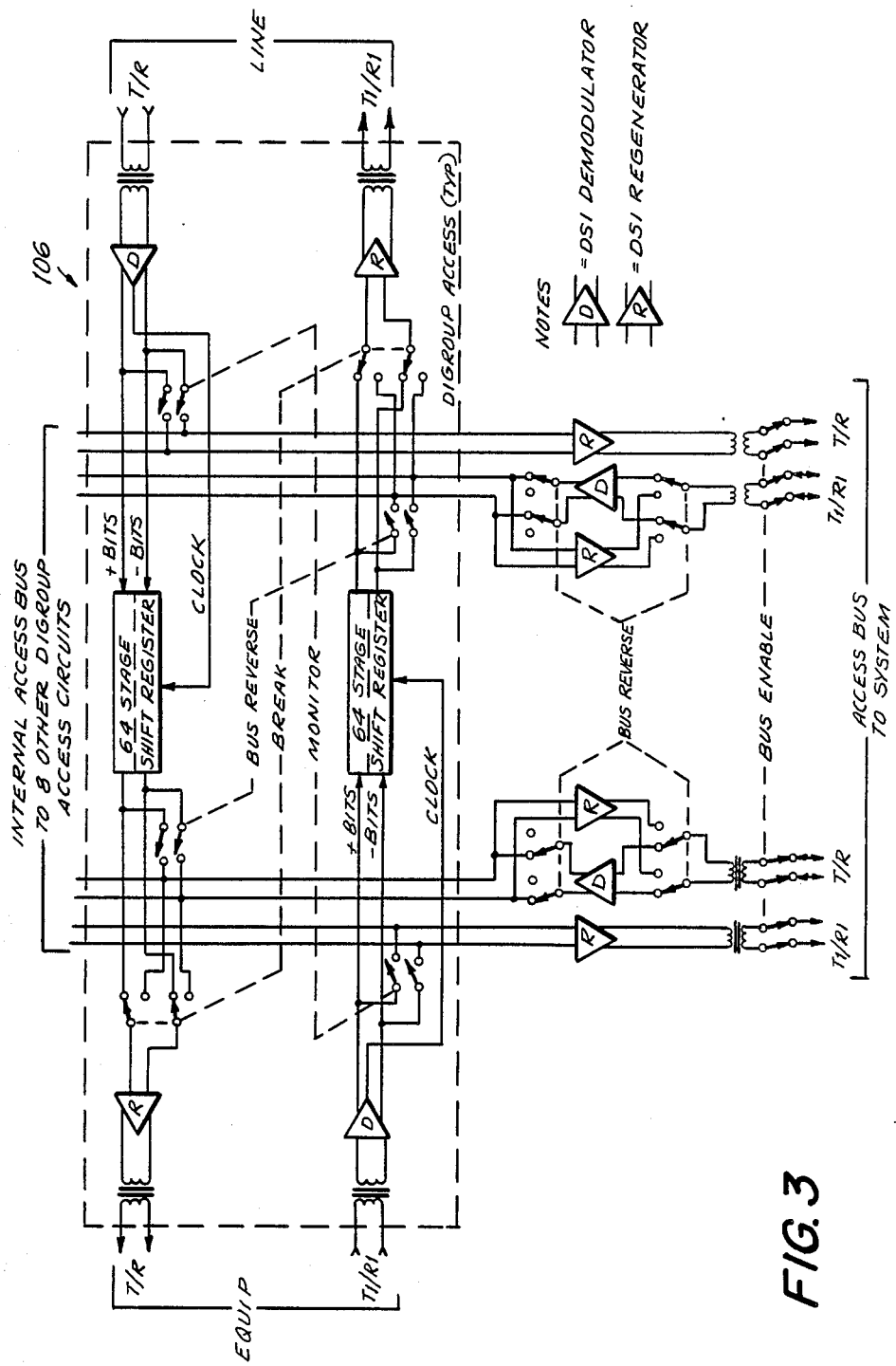
FIG. 3 is a functional block diagram, partially in schematic, of the access card portion of the system of FIG. 1.
Figure 4A:
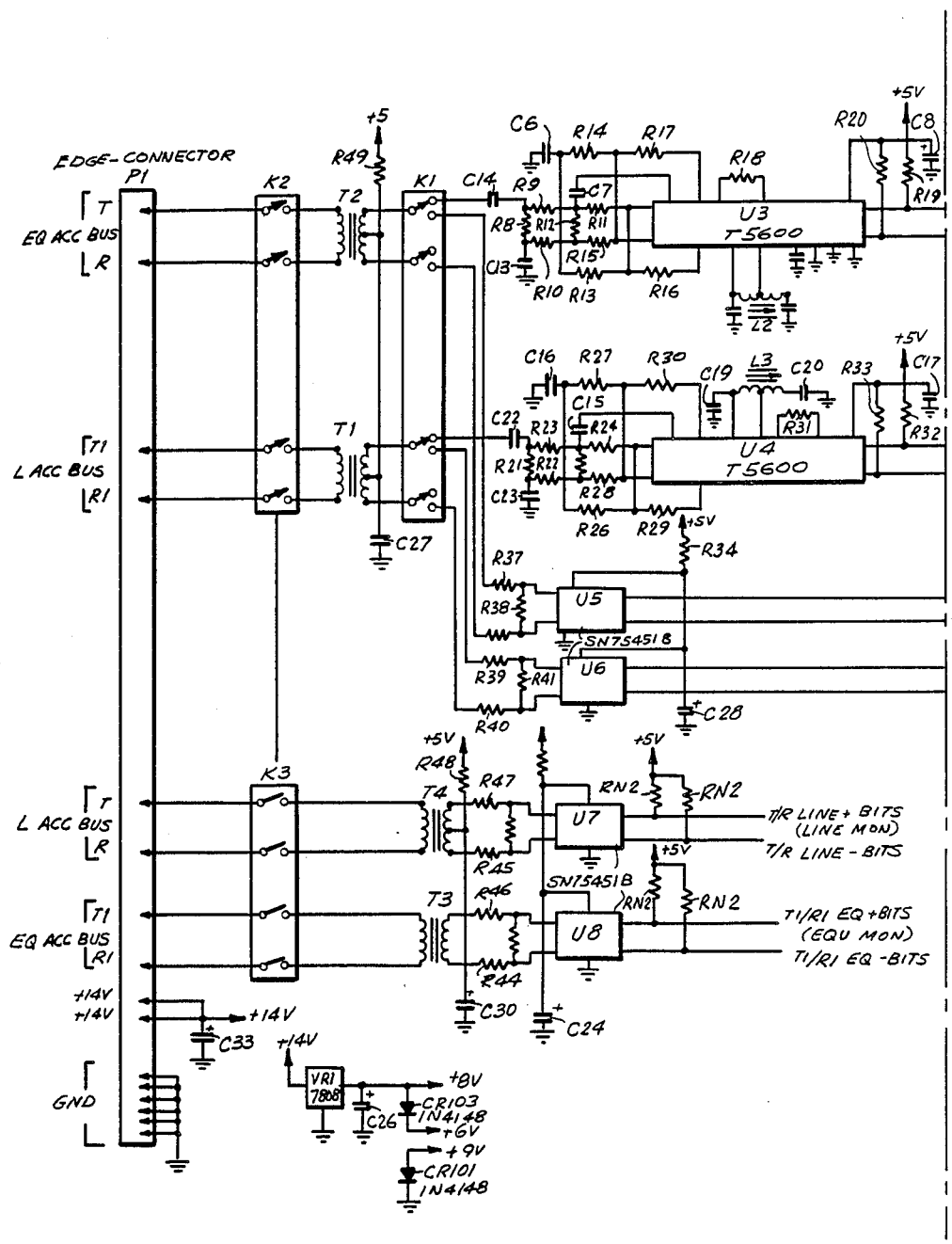
FIGS. 4A, 4B, 5A and 5B taken together comprise a schematic diagram of the access card of FIG. 3.
Figure 4B:
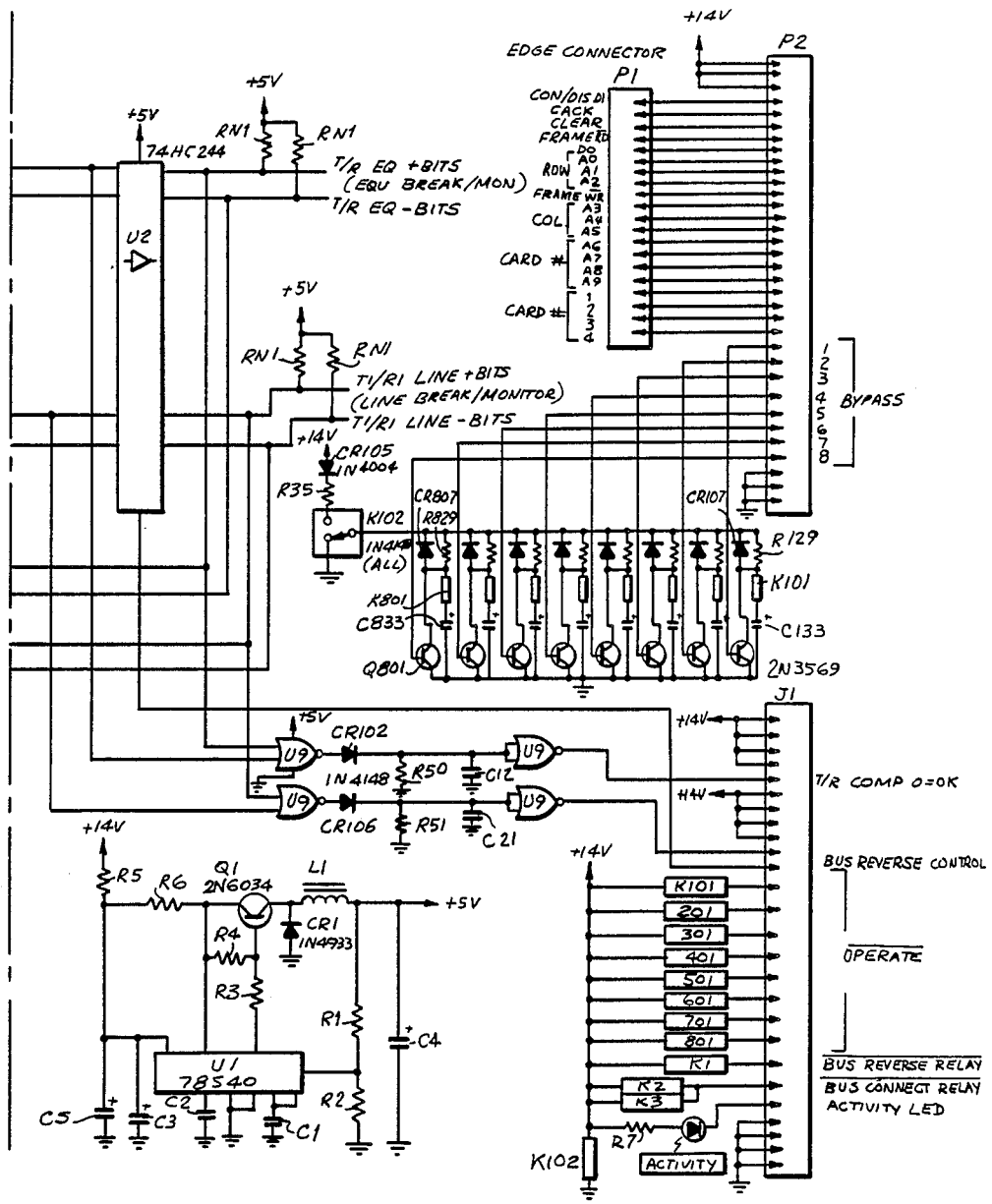
Figure 5A:
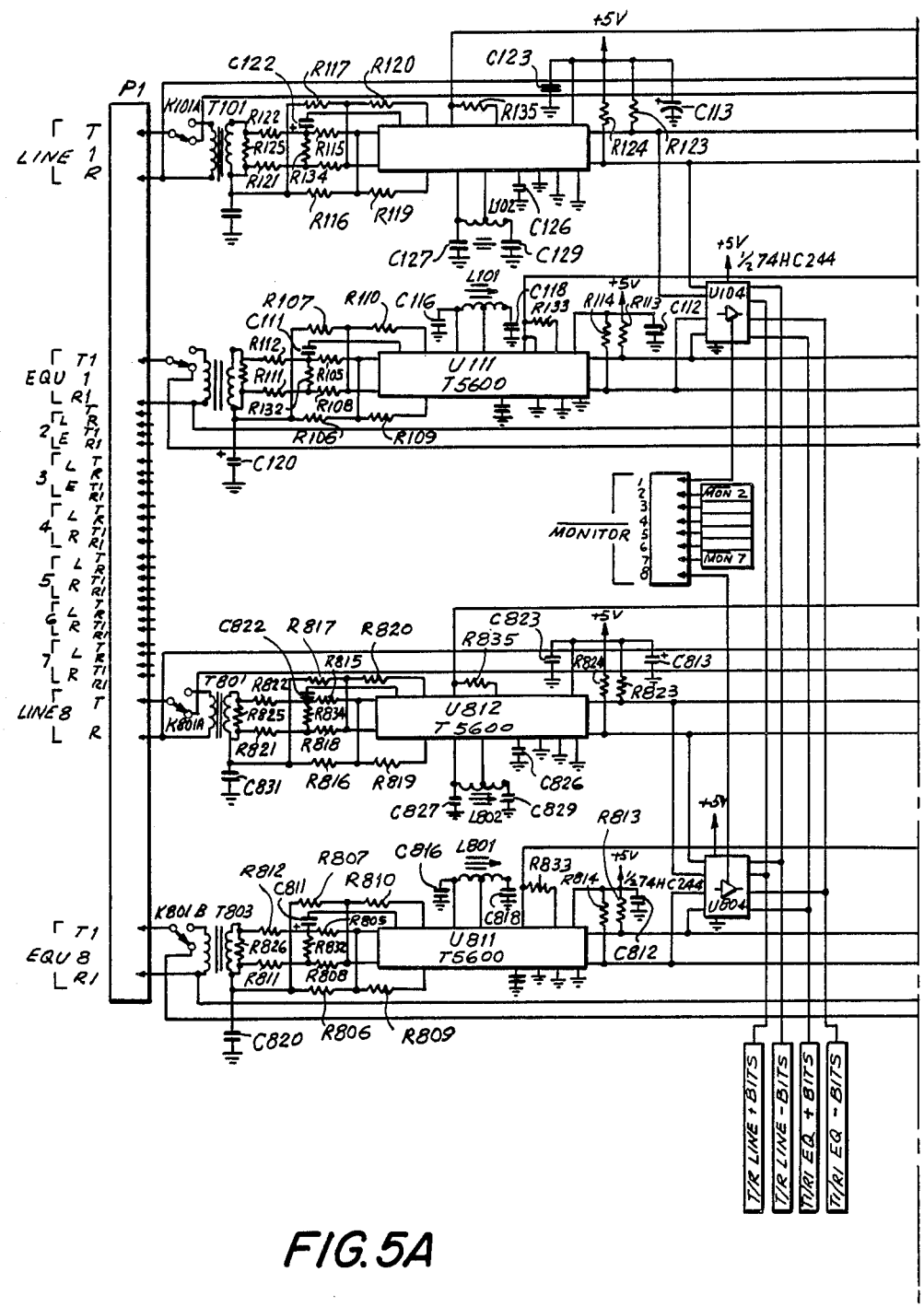
Figure 5B:
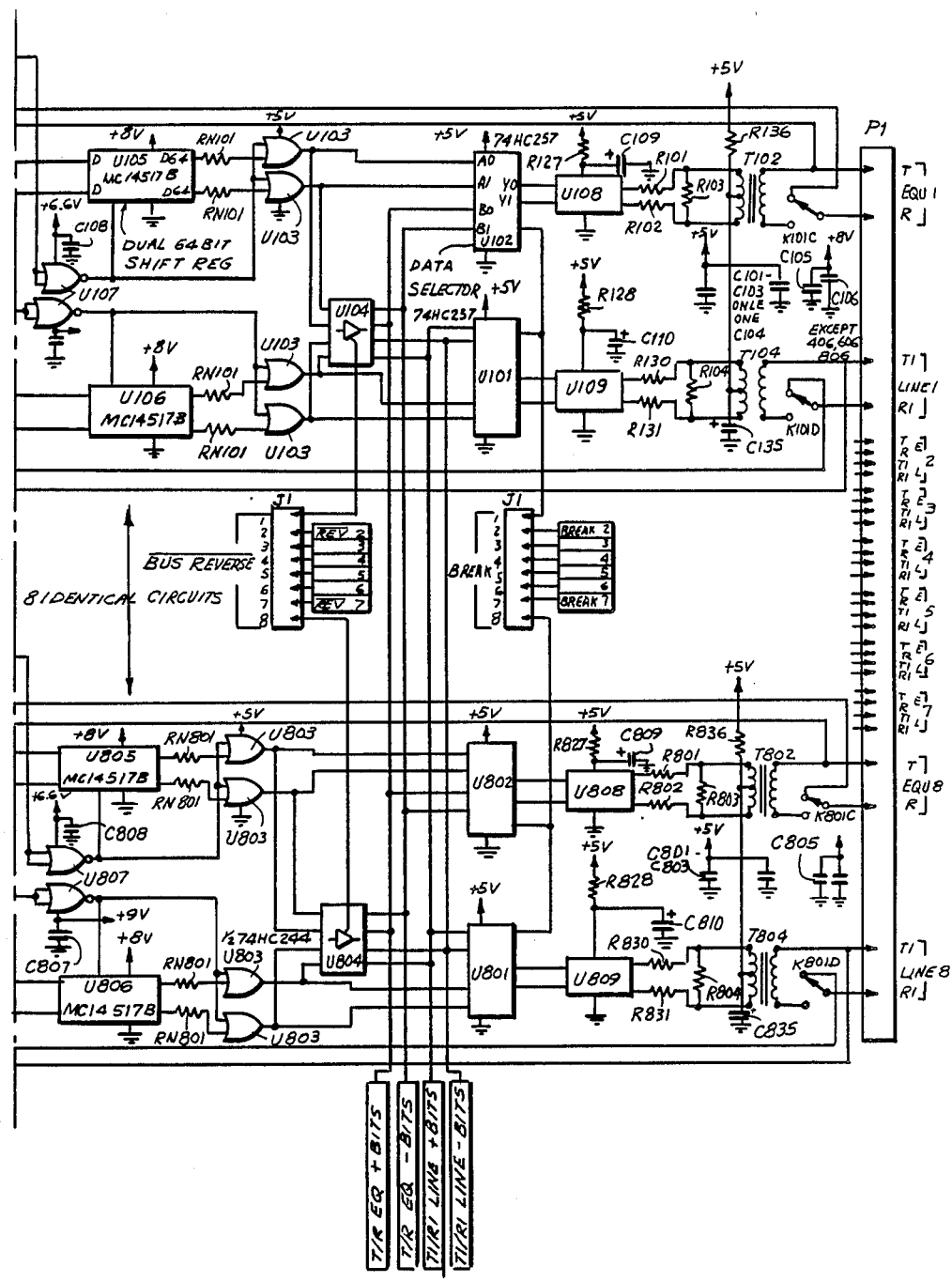
Figure 6A:
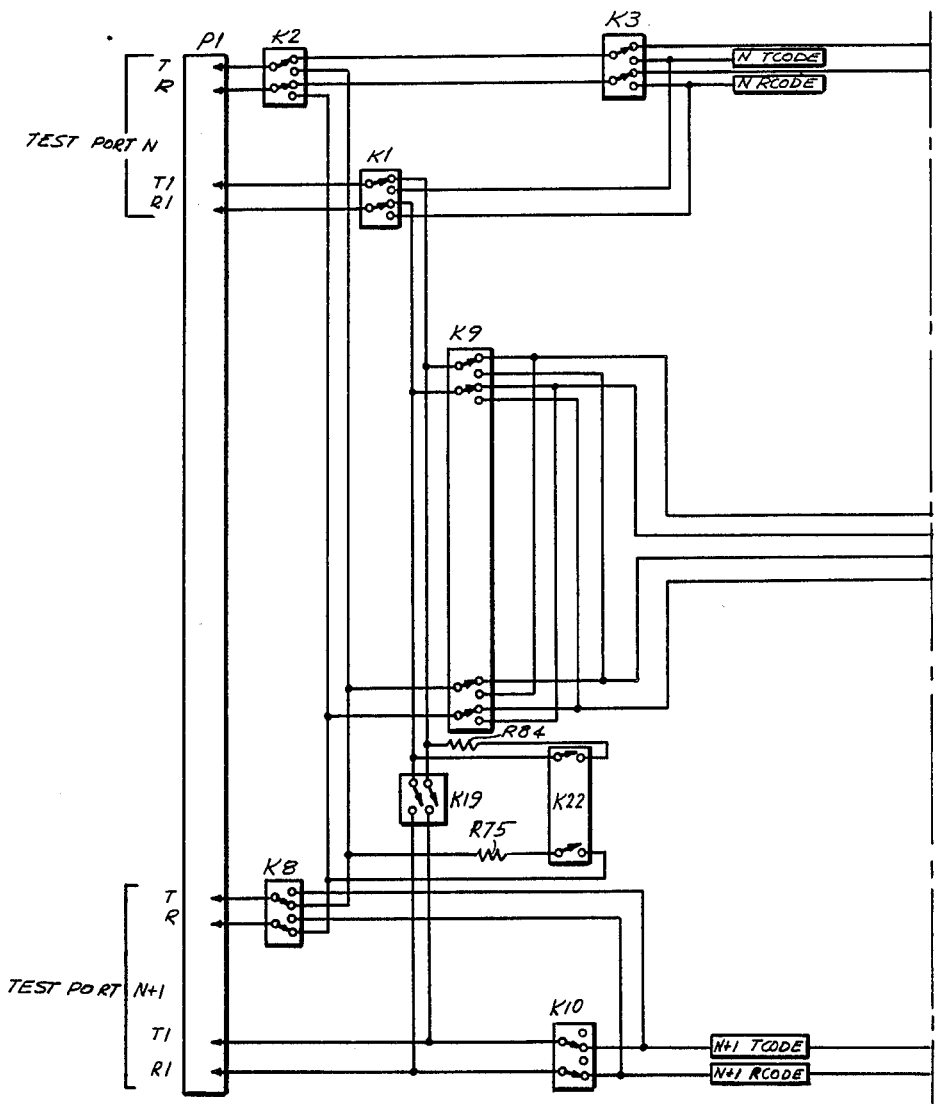
FIGS. 6A, 6B, 7A, 7B, 8A, 8B, 9A and 9B taken together comprise a schematic diagram of the test line connection card of FIG. 3.
Figure 6B:
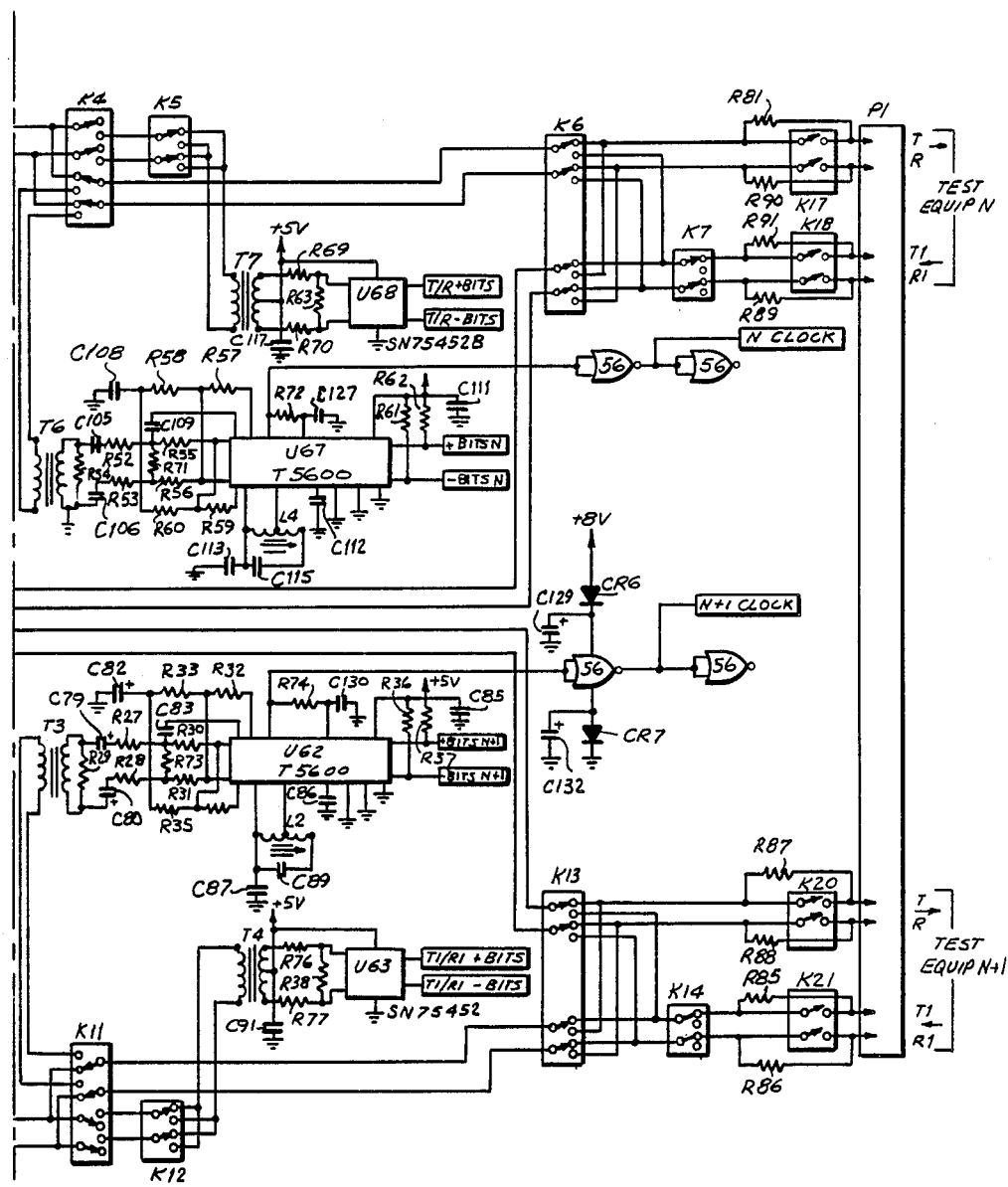
Figure 7A:
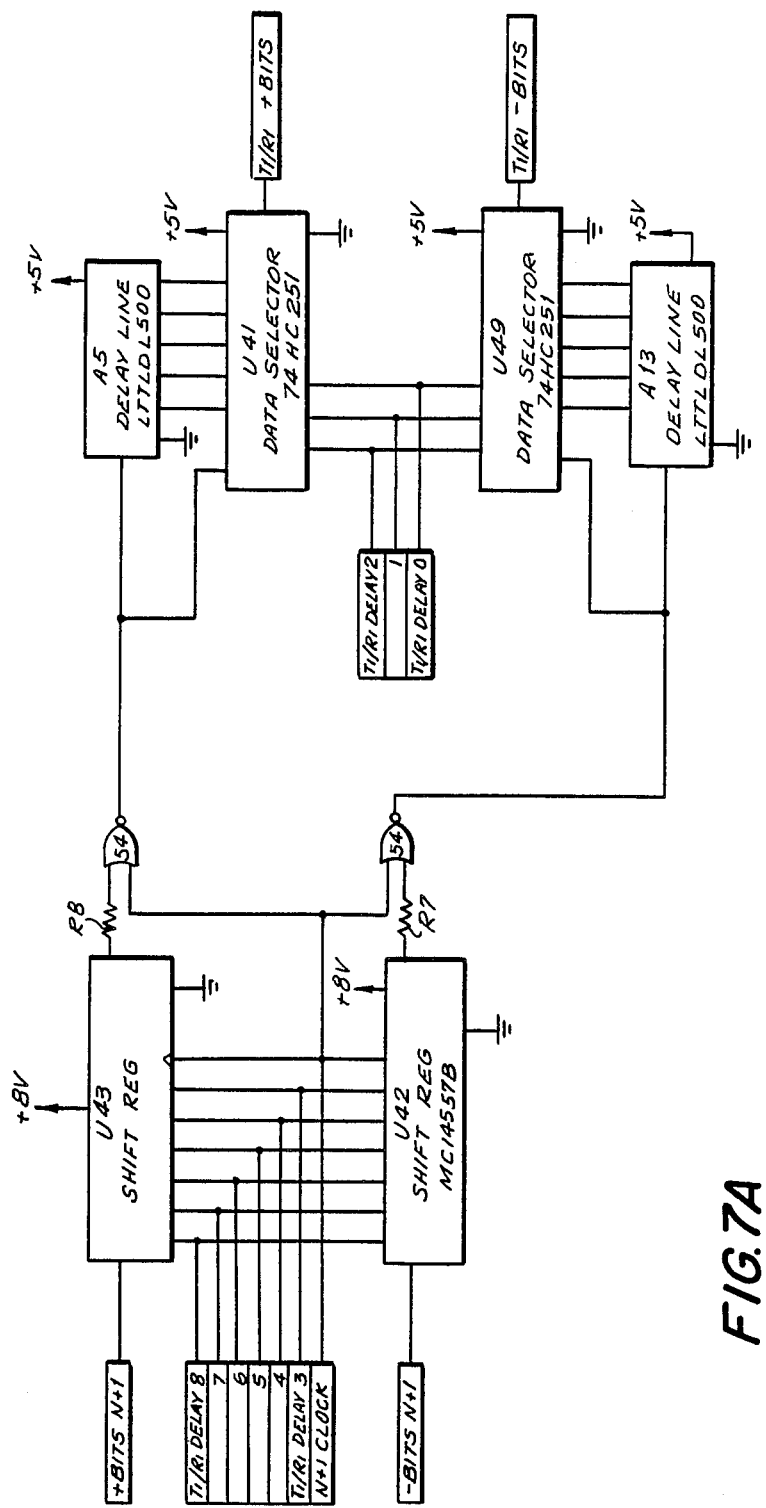
Figure 7B:
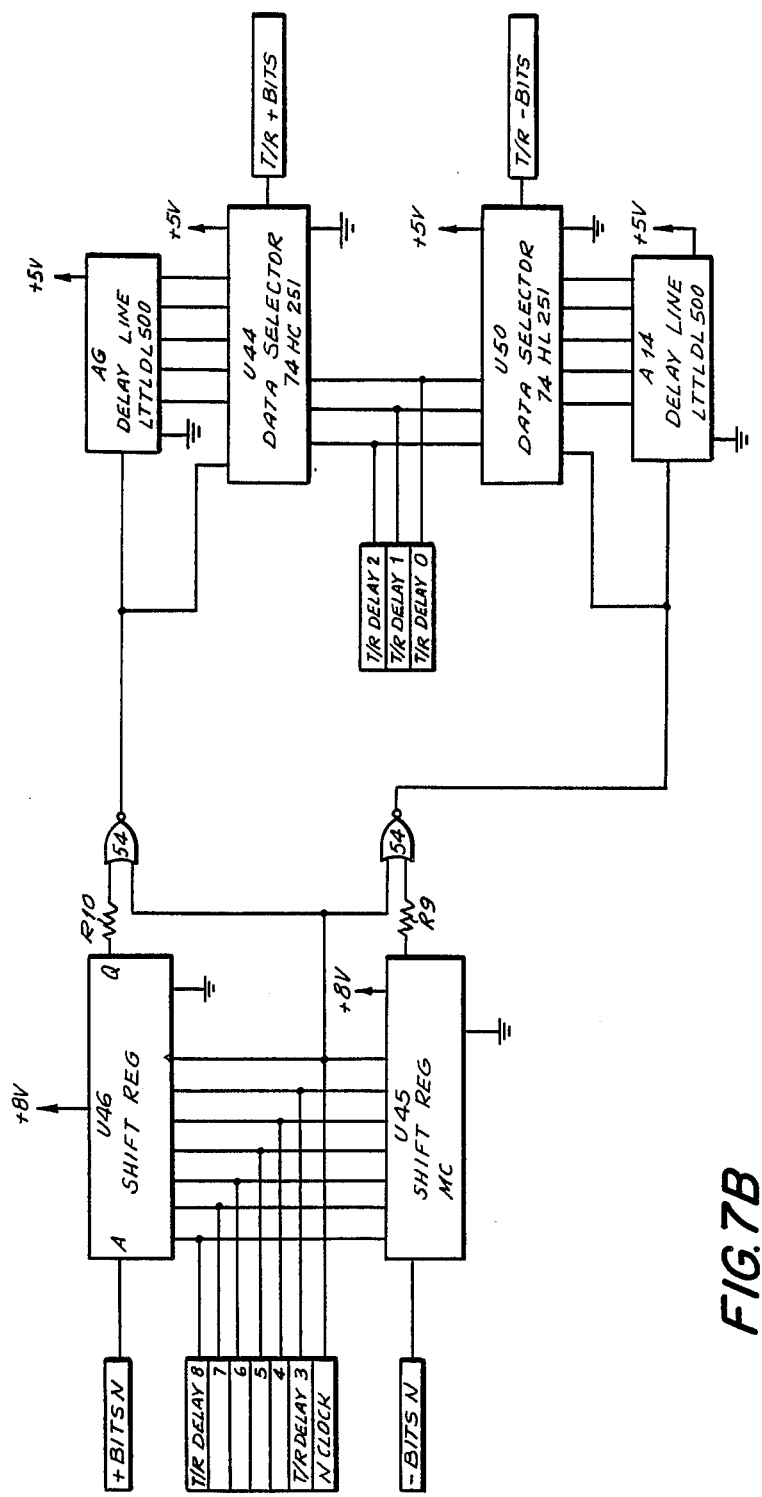
Figure 8A:
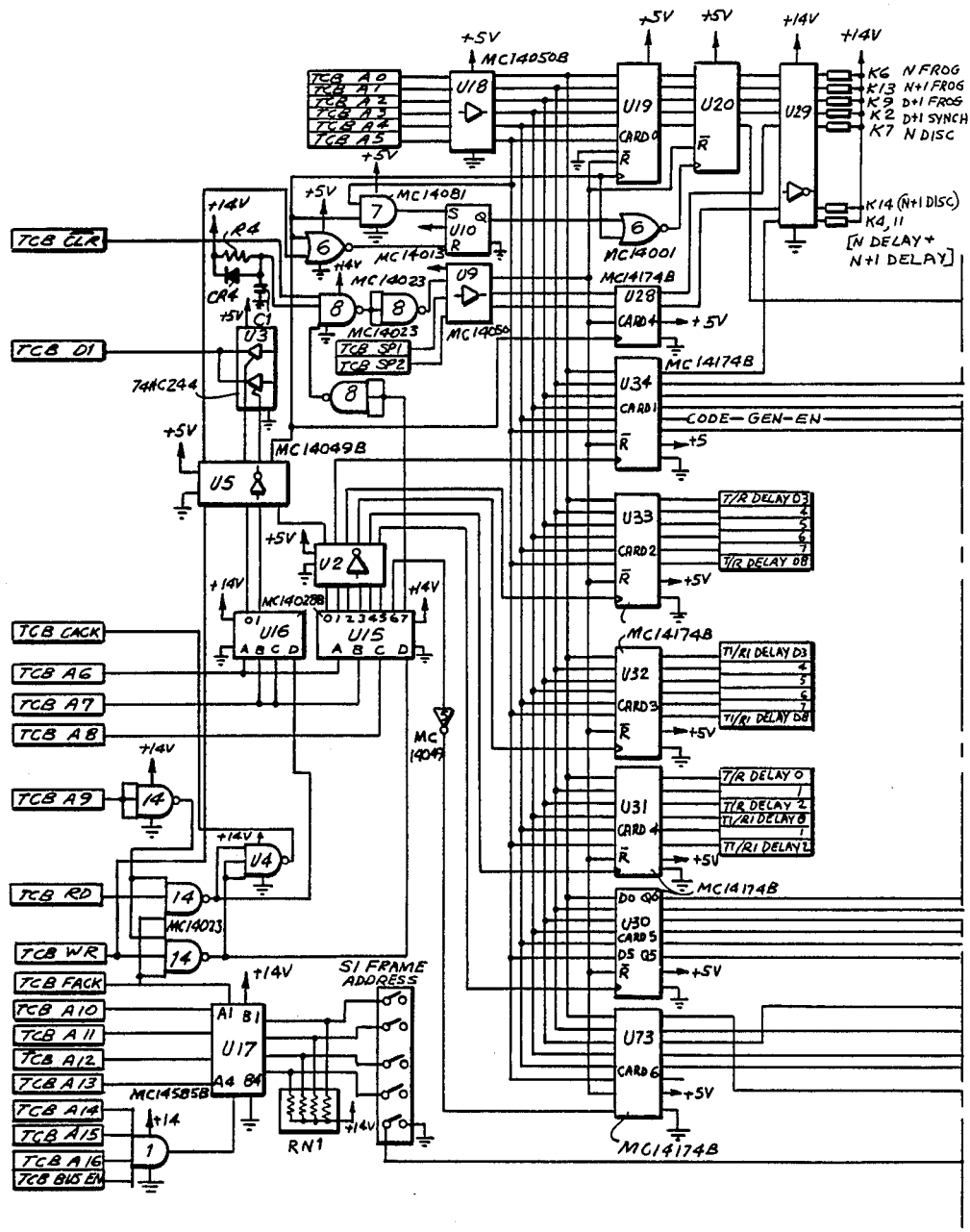
Figure 8B:
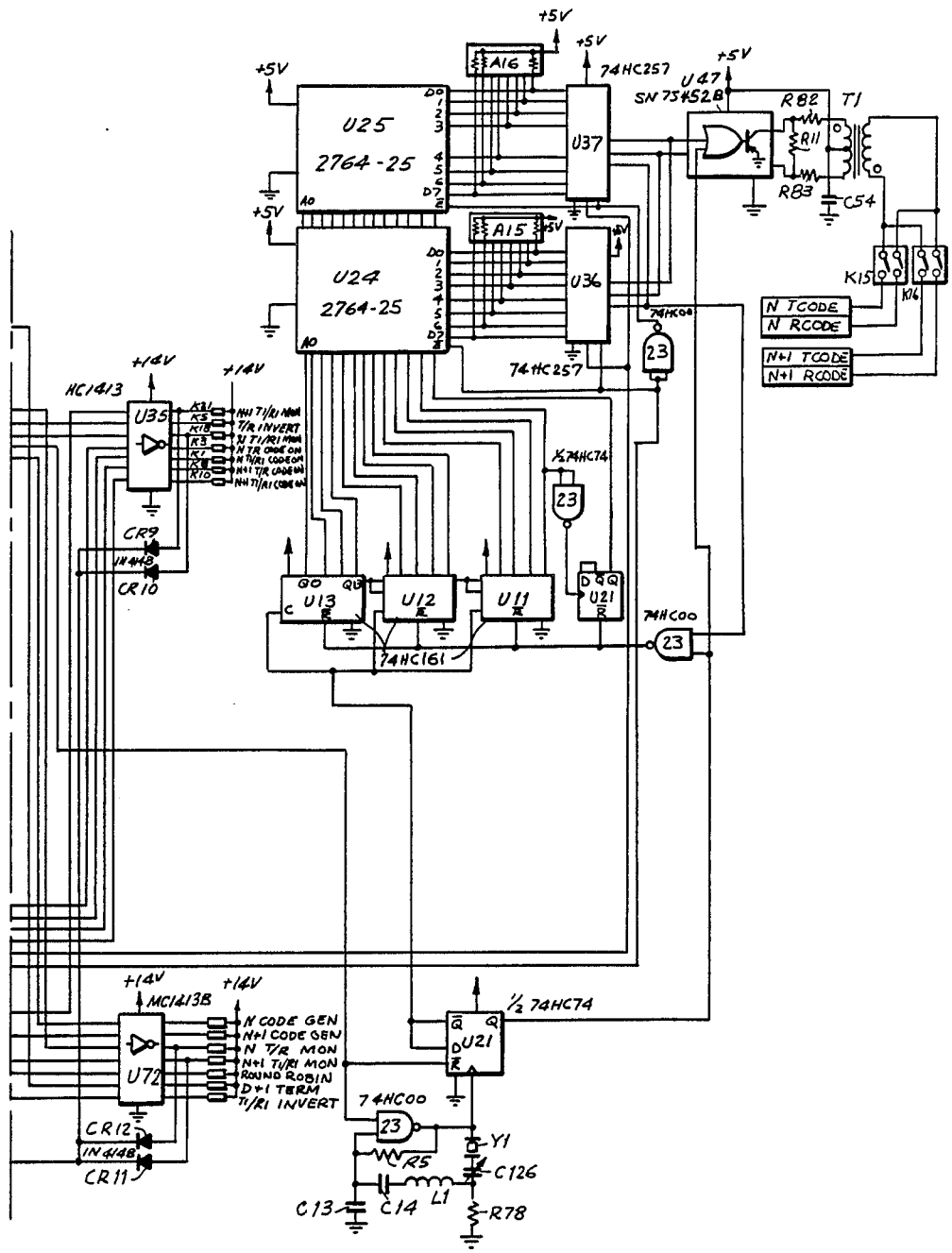
Figure 9A:
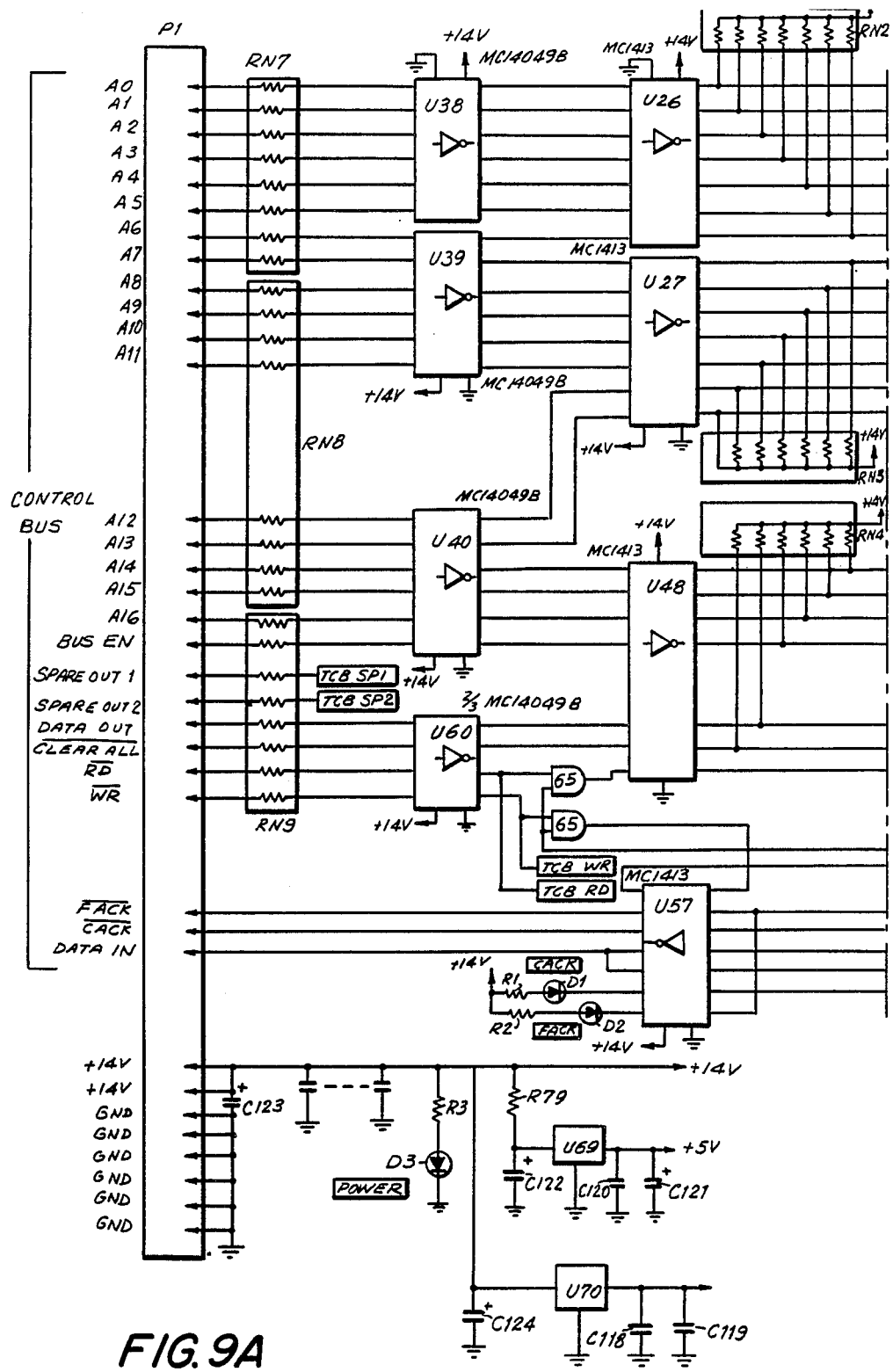
Figure 9B:
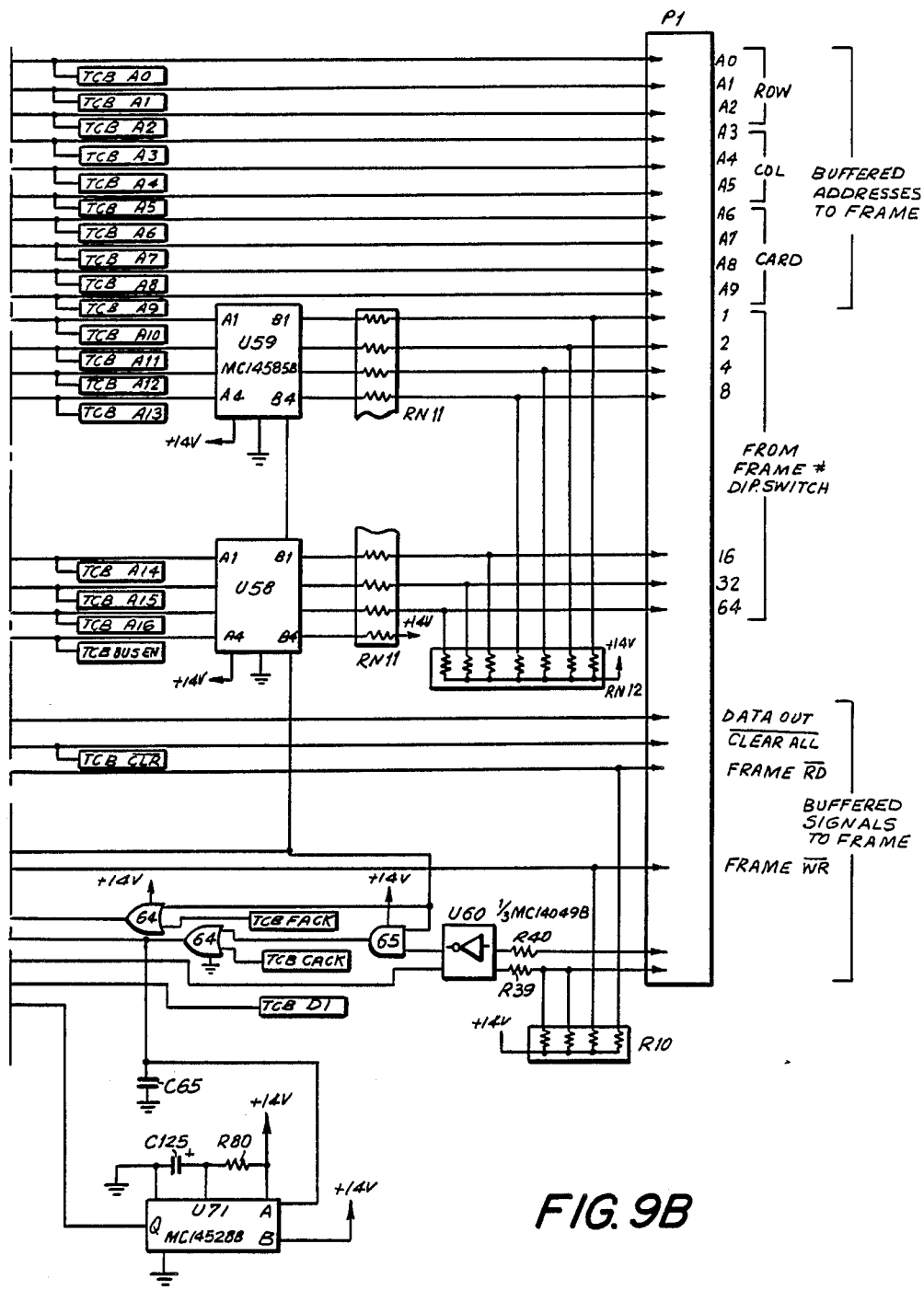

Referring now to the drawings in detail, and initially to FIGS. 1 and 2, the presently preferred improved remote test telephone line access system, generally referred to by the reference numeral 100, is shown. The system 100 of the present invention preferably adds truly hitless drop and insert capability to the conventional T-Class family, and is fully compatible, both forward and backward, with existing conventional T-Class components and permits any combination of SST-Class and T-Class components to be mixed and matched in existing T-Class shelves.

As will be explained hereinafter, the system 100 of the present invention operates with a variety of standard or commercially available drop and insert test sets and even functions with different types of conventional drop and insert test sets simultaneously connected to the same system. As will also be explained in greater detail hereinafter, the characteristics of the conventional test set such as illustrated by reference numeral 102, are automatically compensated for by the system 100 of the present invention. The components of the matrix portion 104 of the system 100 of the present invention are preferably conventional, such as the Domain 3-401 Matrix Card commercially available from Domain Systems Inc., the assignee herein, and need not be described in greater detail herein. As for the access card portion 106 and test line connection card portion 108 of the system 100 of the present invention, those shall be described with reference to FIGS. 3, 4A, 4B, 5A and 5B and 10A and 10B, and FIGS. 6A, 6B, 7A, 7B, 8A, 8B, 9A and 9B, respectively.

In its most basic form the block diagram for SST-Class is similar to the block diagram for T-Class. The primary differences lie not in the physical format of the hardware or the monitor/split/TCB configuration, but in the manner in which the actual access and TCB is handled. Preferably, circuitry is included on the SST-Access card 106 (FIGS. 4A, 4B, 5A, 5B) and the SSTCB card 108 (FIGS. 6A, 6B, 7A, 7B, 8A, 8B, 9A and 9B) to compensate for the different delays found in various drop and insert test sets 102. It is a characteristic of these sets 102 that, although each has its own amount of delay, the delay is constant for each.

To compensate for the drop and insert test set 102 delay, the SST-Access card 106 inserts a fixed system delay 110, 112 into each digital T-Stream (DSl) passing through it. The system delay, which is greater than the delay introduced by the drop and insert test set 102, is always in the circuit 100, and thus does not itself introduce any hits. When a digroup (two DSls comprising a two-way link) is accessed for drop-and insert both DSls preferably loop through the drop and insert tes set 102 in series with an SSTCB or test time card 108, which maintains the system 100 delay by inserting compensating delay into each access loop. Before establishing the loop through the drop and insert test set 102, the delay compensation is set and checked such as by the synchronization function of FIG. 1. The access switching transfers the DSls from the delay on the SST Access card 106 to the delay in the SSTCB access loop. Since the delays are identical the act of accessing does not perturb the DSl, and is hitless.

Once a digroup has been accessed and is being monitored by the SSTCB card 108, synchronizing connections are made in the SSTCB, which connect the two drop and insert inputs accross the inputs of their corresponding DS1. Since the access card 106 circuitry buffers the digroup from the bus, the drop and insert test set 102 is permanently set to terminating input impedance and no hits are introduced. Once the drop and insert has achieved synchronization (FIG. 1), an adjustable delay circuit 120, 122 in each of its outputs is set to the difference between the system delay and the known delay for the drop and insert test set 102 being used. This brings the outputs of the drop and insert test set 102 into synchronization with the output of the access loop, since both are late by the system delay.

Once the timing has been established, the SSTCB connections are reconfigured to place the correctly delayed outputs on the ccess buses (via the matrix 104), where they are available to the SST-Access Card 106. The SST-Access Card 106 then transfers between the outputs of its own internal system delay circuits and the SSTCB outputs on the matrix 104. This splits the DSls and connects the drop and insert outputs to the DS1 sends. The DS1 receives are already terminated on the drop and insert access card 106 inputs, and the drop and insert test set 102 is now in the circuit. Both transfers are done simultaneously. This produces a hitless transfer, and the drop and insert is now inserted into the digroup and is ready for use.

When testing of the telephone line is complete the steps required to connect the drop and insert test set 102 are repeated in the reverse order, removing the drop and insert test set 102 from the digroup and clearing the circuit, also without introducing any errors.

Referring now to FIGS, 3, 4A, 4B, 5A and 5B, the access card 106 preferably accepts up to 8 digroups, each of which encounter the same fixed delay when they pass through. Thus, there are 16 identical circuits, one for each DS1. The access card 106 is preferably equipped with two access busses, the LINE BUS and the EQUIPMENT BUS. Any of the eight digroups passing through this card 106 can be selected for access by these busses. As indicated by their names, the LINE BUS accesses the line side of the selected digroup, and the EQUIPMENT BUS accesses the equipment side. Each bus consists of four wires, T/R and T1/R1, which access the corresponding signals in the digroup. A digroup can be accessed by these busses in either of three modes: PARTIAL MONITOR, MONITOR and SPLIT.

Conventional BYPASS RELAYS are provided to protect service in the event of power loss or the failure of any or all of the digroup logic circuitry. These relays, one for each digroup, are preferably automatically placed in the BYPASS position when the access card 106 is de-energized, and are placed in the OPERATE position on command from the controller when power is applied to the system 100. In the event of power loss the relays return to their BYPASS position, restoring the through path for the digroup and remain so when power is restored, until commanded to insert the logic circuitry. If an access card 106 is unplugged for any reason, it will also preferably automatically revert to the bypass position.

The relays can also preferably be placed in the bypass position on command, so any digroup can be bypassed in the event of logic failure. Since bypass removes the fixed delay 110, 112 built into the SST-Access card 106, a frame hit will occur each time a digroup is bypassed or reinserted.

All DS1 signals, including those coming into the access busses, are preferably, demodulated by a circuit equipped with automatic line buildout correction (ALBO), which compensates for varying input signal amplitude, into three separate signals, +BITS, −BITS, and CLOCK. These three signals completely characterize the input, and are used to accomplish all the delay and access functions within the card 106. A negative pulse occurs on the +BIT signal for each incoming positive excursion, and on the −BIT for each negative excursion. The CLOCK is synchronous with the incoming data rate.

Once the signal has been handled within the card 106, it is regenerated back into a standard level DS1 for outputting. This is preferably accomplished by a circuit utilizing two switching transistors and an output transformer which converts incoming negative pulses on the +BIT and −BIT lines to corresponding excursions on the transformer secondary. Thus, regardless of the incoming level of the DS1, all outputs are at the same, standard DS1 level.

Since the relays are bidirectional, there was no need to consider the direction of signal flow, or the signal amplitude, when designing a conventional T-Access Card. The SST-Access card 106, however, preferably employs logic circuits to do the switching. Therefore, the incoming balanced bipolar DS1 signals must be converted to standard single-ended logic levels for use within the card (demodulated) and converted back to balanced bipolar DS1 signals (regenerated) before being outputted.

Additionally, since access (and break) connections are made at logic levels within the digroup circuitry, the access bus outputs of the card 106 are also demodulated or regenerated (depending on signal flow direction). As can be seen on the block diagram of FIGS. 1-3, one signal pair of each bus is always outward, and a regenerator is permanently connected to these terminals. The other pair of each bus, however, is bidirectional, with signal flowing outward when the BUS REVERSE command is active, and inward at all other times. The bidirectional pairs are preferably equipped with switchable demodulator/regenerators.

In order to allow the system 100 to compensate for the delay introduced by the external drop and insert test set 102, the card 106 preferably introduces a fixed 65 clock period delay. This may be accomplished by means of a conventional dual 64 stage shift register through which both the +BITS and −BITS signals are clocked by the CLOCK signal. The additional delay is introduced by the demodulator and regenerator.

An additional command (BUS REVERSE) is preferably required to control the direction of signal flow through the line and equipment busses. When the card 106 is in the break mode, the signal flows outward in one pair of each bus, and inward in the other. The outward flowing signals are derived by bridging the demodulated undelayed logic signals of the selected digroup, and the inward flowing ones replace the delayed outputs and flow out of the card 106 on the selected digroup. In the monitor mode, however, the signals must flow out of both pairs in each bus, and the busses must be bridged across the digroup signals. The BUS REVERSE command accomplishes this.

Since the inputs and outputs of the access busses are active circuits with input and output impedances, they may have to be removed from the access bus terminals if, for example, the busses are tied to other access cards to form a common bus. For this reason relays are preferably provided on the card 106. These relays are in the disconnected position when de-energized, to remove the card 106 from the busses in the event of power loss, and are energized by the BUS ENABLE command. Since these relays are preferably needed only in special applications, they need not be installed all of the time.

In the system 100 of the present invention SST-Class, because of the directionality of the logic, monitoring requires three commands; BUS ENABLE, MONITOR and BUS REVERSE. The MONITOR command connects the two DSls (derived from the demodulators but undelayed) to the access bus output terminals: equipment to the EQUIPMENT BUS T1/R1 and line to the LINE BUS T/R. Monitoring in this condition requires using two ports, since one output appears on the EQUIPMENT BUS and the other on the LINE BUS. The REVERSE command permits normal monitoring. It configures the reversable access bus terminals as outputs and connects the two DSls (delayed) to the access bus terminals: equipment to the EQUIPMENT BUS T/R and Line to the LINE BUS T1/R1. Additionally, since the accesses are made on both sides of the delay circuit, each bus has one delayed and one undelayed signal. These delays are maintained in the SPLIT access mode. This is necessary so that the SSTCB can synchronize to delay of the test equipment 102 and adjust its own delay to simulate the delay of the SST-Access card 106.

In order to break, so that split to line, split to equipment or drop and insert can be accomplished, three commands are also preferably required: BUS ENABLE, MONITOR and BREAK. In this mde both sides of the digroup are broken and brought to the access busses.

In order to eliminate tip-ring reversals in the drop and insert Sync Mode, the SSTCB is preferably equipped with reversing relays. The presence of a reversal is sensed by two comparators 130, 132 on the access card 106, one for each path. The comparators 130, 132 are connected across the two signals that are to be switched when the top and insert test set 102 is inserted. The comparators 130, 132 verify that the two signals are in the same phase, not that they are delayed correctly. Since the two directions synch up independently, the comparators 130, 132 can be read individually.

The SSTCB of system 100 may be connected to any pair of adjacent ports in the SST-Class system. The lower numbered port must be odd. For this reason, schematics and block diagrams designate the ports 'N' and 'N+1'. Each port consists of two two-wire pairs T/R and T1/R1.

The T-Class functions are illustrated in FIGS. 1 and 2, and are unchanged. For brevity, single port functions are illustrated on Port N only. Port N+1 is similar. Initially, before any access is made, all relays are in the cleared condition.

Monitoring is done via the equipment bus, and connects both DSls directly to the test set 102 terminals. If the test set 102 can monitor on both inputs, this is all that is required. If not, K7 must be opened to isolate the transmit from the test set 102. The DSl to be monitored can then be selected by operating K5.

The Equipment Bus is brought through the matrix 104 to Port N. To provide correct signal flow directions K5 must be operated. If the code generator 124 is to be used, the Line Bus must be brought to Port N+1 via the matrix 104 and K9 closed. Note that this arrangement uses both ports, limiting the number of simultaneous tests that can be performed.

In the case of T-Class split to line, the Line Bus is brought to Port N. Since the test set 102 is looking in the opposite directon K5 must be de-energized. To use the code generator 124, the Equipment Bus must be brought to Port N+1, and K6 closed.

T-Class drop and insert synch, is done to eliminate hits which may otherwise be taken when inserting the drop and insert test set 102. Only the monitor bus is used, although both busses are brought to the ports in preparation for the subsequent switching action. K2 and K3 direct the monitor signals to the inputs of the drop and insert test set 102. The operator preferably checks the drop and insert test set 102 to verify that it is synchronized before switching. The software can monitor the pair of comparators 130, 132 on the access card 106, which check that the phase of the delayed signals (access card 106 and test set 102) match. If they disagree, K5 and/or K12, the polarity reversal switches 134, 136, can be activated to reverse the T/R or the T1/R1 leads to correct the phase. The SST-Class monitor function preferably uses the Equipment Bus. When using the SST-Access signal, direction has to be taken into account, so the Bus Reverse command is used to convert the bus inputs into outputs for monitoring. If the test set 102 cannot monitor on both terminals, it is preferably necessary to open K7 and use K5, as before.

Referring to FIG. 1, in SST-Class, the drop and insert synchronization function is preferably accomplished automatically. When an Insert command is to be executed, the following sequence of events occurs:

1-Both the Monitor and the Bus Reverse command are sent to the SST-Access card, converting both busses to monitoring.

2-The matrix 104 is operated, bringing both busses to the SSTCB 108 Equipment to Port N, Line to Port N+1.

3-The relays on SSTCB 108 are configured, bringing the DS1 input (undelayed) signals to the drop and insert test set 102, and the outputs of the drop and insert test set 102 through the variable delay circuits 102, 122 to the access busses and thus back to the access card 106 (which does not insert the signals yet). Thus, the two signals between which the switching is to occur are brought to opposite sides of the comparators 130, 132 located on the access card 106.

4-The variable delays 120, 122 are set to the expected values for the specific drop and insert test set 102 connected to the ports being used.

5-The outputs of the comparators 130, 132 are checked to verify pulse-for-pulse phase agreement between the drop and insert test set 102 outputs and the DS1 signal it is intended to replace. This is necessary because typical drop and insert test sets 102 synchronize randomly in phase when the signal is first applied. If the comparators 130, 132 indicate a phase difference, the corresponding connection between the SSTCB and the access card 106 (via 130, 132 the matrix 104) is turned over on the SSTCB. The comparators 130, 132 are then rechecked. If agreement now occurs, the SST-Class drop and insert synchronization is reported good, and the drop and insert command can be executed.

If not, an error is reported and the command is aborted.

Referring now to FIG. 2, the SST-Class drop and insert command performs the following functions, depending on the type of access card 106 through which the T1 line under test passes:

| FUNCTION PERFORMED | CARD SST | TYPE relay | NO. OF TEST SETS REQUIRED |
| --- | --- | --- | --- |
| 1-MONITOR signal coming from Line Side | x | x | 1 |
| 2-MONITOR signal coming from Equipment Side | x | x | 1 |
| 3-MONITOR signal from both sides simultaneously | x | x | 2 |
| 4-TEST Line Side | x | x | 1 |
| 5-TEST Equipment Side | x | x | 1 |
| 6-TEST both sides simultaneously | x |  | 2 |
| 7-INSERT Drop and Insert Test Set (causes a hit going in and out), followed by TEST DS0 via Drop and Insert (no hits) TEST DS0A via Drop and Insert (no hits) TEST DS0B via Drop and Insert (no hits) |  | x | dual D & I |
| 8-INSERT Drop and Insert Test Set (no hits in or out), followed by: TEST DS0 via Drop and Insert (no hits) TEST DS0A via Drop and Insert (no hits) TEST DS0B via Drop and Insert (no hits) | x |  | 1 dual D & I |
| 9-TEST ROUND ROBIN, send to Equip T/R, receive on line T/R | x | x | 2 |
| 10-TEST ROUND ROBIN, send to Line T1/R1, receive on Equip T1/R1 | x | x |  |
| 11-LOOP BACK METALLIC, Line Side (no repeater, other side both pairs terminated) |  | x |  |
| 12-LOOP BACK METALLIC, Equip Side (no repeater, other side both pairs terminated |  | x |  |
| 13-LOOP BACK METALLIC, both Line and Equipment sides simultaneously (no repeater) |  | x |  |
| 14-LOOP BACK via REPEATER, Line Side (other side terminated incoming, Type 2 keep alive sent outgoing on command) | x |  | 0 |
| 15-LOOP BACK via REPEATER, Equip Side (other side terminated incoming, Type 2 keep alive sent outgoing on command) | x |  |  |
| 16-LOOP BACK via REPEATER, both Line and Equipment simultaneously | x |  |  |
| 17-RESTORE Line Side (with spare T1 line) | x | x |  |
| 18-RESTORE The Equip side (with spare T1 line) | x | x | 0 | insert command is preferably executed only fter a successful drop and insert Synchronize command. It is preferably accomplished in two steps:
1-The bus reverse command is removed from the SST-Access card 106, converting the two reversable bus pairs to inputs, and disconnecting them from the DSls.
2-A Break command is sent to the SST-Access card 106. This command will be executed by the card 106 independently of the signals on the DS-1, since the two signals being switched are in synch.

To remove the drop and insert test set 102, the Break command is removed from the SST-Access card 106, then the Monitor command is removed and the remaining relays de-energized.

Round Robin testing requires that the CSUs at the far ends of both links be placed in loopback, by sending a special code to them. Placing both ends in loopback can be done by first configuring for Round Robin, then sending the loopback code. The first CSU will go into loopback and the code will then be forwarded to the second one, which will also go into loopback. To get out, however, sending the cancel loopback code will clear the first CSU, cutting off the circuit, and the second one will thus never get the code. An extra step must be added to allow the system 100 to send the cancel code to the second CSU after the first has been cleared and the Round Robin configuration has been dropped. In a system 100 equipped with one or more SSTCBs of the present invention and any combination of electromechanical (relay) or electronic (SST) access card 106, Preferably, the conventional drop-and-insert test sets 102 usable with the system 100 of the present invention shall have at least the following minimum characteristics by way of example: the ability to enter the bit stream in both directions (East-West and West-East) simultaneously (it is not necessary that a channel be extracted in both directions simultaneously); the delay through the test set 102 in each direction shall be less than 64 bits, and shall be the same in both directions; the delay in either direction shall not vary more than 0.1 bit with the various modes of operation of the test set 102; the delay shall not vary more than 0.1 bit during the time interval of any test as a result of environmental influences encountered in the facility housing the system, such as but not limited to, line voltage, temperature, humidity; the inputs and outputs of the test set shall meet the standard specifications for termination of T1 signals for the industry in general; for use with systems having only SST Access cards 106, the test set 102 shall be capable of being configured for terminating inputs, with a minimum sensitivity range of 1.0 to 6.0 volts base-to-peak; and for use in electromechanical or mixed systems, the test set 102 shall function over the above specified levels while in a bridging mode with a minimum of 1000 ohms input impedance, or alternatively, shall have sufficient sensitivity to function over the above levels in terminating mode with a 430 ohm resistor in series with each input lead of the T/R or T1/R1 pair.

A typical set of exemplary technical specifications for the presently preferred system 100 of the present invention is as follows for SST-Class, T-Class and Combined Systems:

| | |
|---|---|
| System Size | |
| Maximum Access Shelves | 8 |
| Digroups/System | 8 minimum |
| | 1024 maximum |
| Test and/or Backup | |
| Ports/System | 4 minimum |
| | 16 maximum |
| Modularity | |
| Digroups/Shelf | 128 |
| Access Cards/Shelf | 16 |
| Digroups/Access Card | 8 |
| Protection | |
| Power Loss | Automatic relay bypass |
| Equipment Failure | Relay Bypass on command when possible |
| Blockage | |
| Per DS1 | 1/8 |
| Per Access Card | 1/card |
| Per Access Shelf | 16/Shelf |
| Per Test Port Standard | 1/Test Port |
| Per Test Port Drop and Insert | ½ Test Ports |
| Access | |
| Types | Monitor, Split to Equipment, Split to Line, Service Restoral, Drop and Insert, |
| Test Equipment | |
| Types | Terminating, single Drop and Insert, dual drop and Insert |
| Code Transmission | |
| Type | Selected code sent on unused side of split DS1, on command |
| Codes | Idle Channel |
| | Alternate 1/0 |
| | Custom #1 |
| | Custom #2 |
| | Quiet Terminate |
| Synchronization | Unsynchronized |
| Input: | |
| Impedance | 100 ohms, balanced |
| Signal Type | Bipolar |
| Coupling | |
| SST-Class | Transformer isolated |
| T-Class | Direct Connection |
| Level Range | 0.3 to 6 V peak deviation from zero |
| Frequency Range | 1.544 mHz +/− 500 Hz |
| Output: | |
| Impedance | 100 ohms balanced |
| Signal Type | Bipolar, regenerated |
| Level | 3-0-3 +/− 0.5 Volts |
| Coupling | |
| SST-Class | Transformer isolated |
| T-Class | Direct Connection |
| Access: | |
| Blockage | 1 digroup per card |
| Types | See above function Table |
| Synchronization | |
| Functionality | Will function with synchronized, unsynchronized, or mixed systems |
| Source | Internal, derived from individual inputs |
| Output | Derived from input of corresponding DS1 |
| Crosstalk | Less than −50 dB |
| Connectors | |
| Monitored Digroups | Wire wrap terminal blocks |
| Test Equipment and Spare DS1s | Type 310 jackfield |
| Control (RS-232) | 25 Pin Type D female |
| Power | Binding Posts |
| Power (for a 128 digroup, 8 port system with 1 SSTCB, exclusive of test equipment) | |
| 48 Volt Station Battery | |

| -continued | |
|---|---|
| Voltage | −42.75 to −52.5 V DC |
| Current | 1.1 amperes |
| AC Mains | |
| Voltage | 115V AC +/− 10% |
| Frequency | 60 +/− Hz |
| Power | 300 watts |
| Component Current Drain | |

By way of example, the current ratings of the various components of the SST-Class System are:

| | |
|---|---|
| SST-Access Card | 0.8 amps (worst case) |
| SSTCB | 0.5 amps (D & I inserted) |
| T-Access Card | 0.08 amps (split) |
| | 0.12 amps (split + term) |
| T-Matrix Card | 0.12 amps/port |
| TCB | 0.2 amps (D & I inserted) |
| Controller | 2.0 amps (any state) |
| Environmental | |
| Temperature, operating | 0 to 50C (+32 to +122F) |
| Humidity | 5 to 95%, non condensing |
| SST Access Card 106 | |
| Number of Digroups: | 8 |
| Synchronization | internal each DS1 independent |
| Delay: | |
| Magnitude | 65 clock periods |
| Distribution | |
| Monitor Bus | 0.5 clock periods from Input Terminals |
| Break Bus | 64.5 clock periods from Monitor Bus |
| Accuracy | +/− .05 clock period |
| Input: | |
| Impedance | 100 ohms, balanced |
| Signal Type | Bipolar |
| Coupling | Transformer isolated |
| Level Range | .3 to 6V peak deviation from zero |
| Frequency Range | 1.544 mHz +/− 500 Hz |
| Output: | |
| Impedance | 100 ohms balanced |
| Signal Type | Bipolar, regenerated |
| Level | 3-0-3 +/− 0.5 Volts |
| Coupling | Tranformer, isolated |
| Access: | |
| Blockage | 1 digroup per card |
| Types | See Table below |

| ACCESS TYPE | STATUS OF ACCESSED DIGROUP | ACCESSED SIGNAL ON THE EQUIPMENT BUS | | ACCESSED SIGNAL ON THE LINE BUS | |
|---|---|---|---|---|---|
| | | T/R | T1/R1 | T/R | T1/R1 |
| Partial Monitor | Thru | N/C — | Undelayed Output | Undelayed Output | N/C — |
| Monitor | Thru | Delayed Output | Undelayed Output | Undelayed Output | Delayed Output |
| Break | Split | Delayed Input | Undelayed Output | Undelayed Output | Delayed Input |

| | |
|---|---|
| Bus Input/Output: | |
| Monitor (output only) | Same as signal output |
| Break | |
| As output | Same as signal output |
| As input | Same as signal input |
| Protection: | |
| Automatic | Bypass on power failure by means of relay contacts |
| Manual | Bypass relay may be activated on command |

By way of example, the characteristics of the SSTCB card 108 may be as follows:

| | |
|---|---|
| Number of ports | two test ports feeding two instruments |
| Synchronization | Internal, independent for each port |
| Delay | |
| Availability | One for each drop and insert test set 102 output |
| Adjustability | Independent |
| Magnitude | 1 to 65 clock periods |
| Adjustment | |
| Coarse | 1 to 64 in 1 clock period steps |
| Vernier | 0 to .8 in 0.2 clock period steps |
| Input | |
| Modes other than with demodulation and regeneration | as required by test set 102 |
| Other Modes | |
| Output | |
| Modes other than with demodulation and regeneration | as required by test set 102 |
| Other modes | |

SST-ACCESS CARD 106

The functions of the SST-Access card 106, by way of example, are as follows:

1-Provide through passage for eight indendent digroups, with regeneration.
2-Protect the digroups from power failure (and also equipment failure) by bypassing them with relays which transfer to the bypass mode on power failure, and on command.
3-Provide fixed constant calibrated through delays to the digroup, so that external delays in the test equipment 102 can be compensated for.
4-Provide monitoring, in which both busses (Equipment and Line) are monitoring the digroup, with the same delays as they have in the Break mode.
5-Provide break capability, in which the signals flowing through the card input are split. The inputs are regenerated, then flow out either the EQUIPMENT or LINE BUS to the external test equipment. They then flow back into the same bus, are regenerated and sent out the card output.

DIGROUP DELAY AND ACCESS CIRCUITS

Referring now to the schematic diagram of FIGS. 4A, 4B, 5A and 5B, there are preferably eight identical delay and access circuits shown. Each circuit preferably passes one digroup. A digroup consists of two DS1 signals flowing in opposite directions to provide full duplex transmission. Thus, Digroup 1 has signal flowing into the LINE T/R and EQUIPMENT T1/R1 terminals, and out of the EQUIPMENT T/R and LINE T1/R1 terminals. Since all the circuit paths are the same, the following discussion will refer to the T/R circuit path of digroup #1 only, by way of example. The components for each digroup are illustratively designated with three digit numbers. The first number is the digroup number, and the last two are the component number, so that similarly located components in each digroup circuit have the same last digit. The incoming signal is passed through transformer T101 to convert it from balanced to single-ended and impressed, through series resistors on the input circuit of U101. The IC contains a high gain balanced input amplifier. The balanced outputs of the amplifier drive three independnet circuits are as follows:

The first circuit is a gain control circuit which provides current for a pair of Automatic Line Buildout (ALBO) diodes. These diodes are connected across the inputs in series with a resistor R101 and R102. The diodes are internally connected between pins 3 and ground and pin 4 and ground. The diode current increases with the output of the amplifier, and as it does so the diode impedance decreases, attenuating the inputs. This provides gain control, compensating for varying input levels.

The second circuit is a clock recovery circuit which preferably consists of a full wave rectifier driving a tuned (tank) circuit. The output of the rectifier is the clock frequency, which is the second harmonic of the input.

The third circuit is a slicing circuit, which separates the positive and negative excursions of the input into separate outputs (+bits and −bits).

The clock and +bit/−bit signals are then combined within the chip by means of two flip flops, to produce the +BIT and −BIT outputs of the IC. These two signals are preferablydelayed ½ a bit width relative to the input signal, because of the preferred sampling of the incoming signal in the center of the time slot.

The clock output of the input IC, which is present on tuned circuit L101 and C108, is amplified and limited into a square wave by U103. C109 DC isolates the input, while R112 provides DC feedback which biases the gate to its switching point. Thus the circuit is independent of the DC level out of U101.

The two outputs of U101 (+bits and −bits) are negative pulses, and are preferably used for two purposes. They may be connected to the EQUIPMENT BUS via tri-state buffer U104 for monitoring, and are also clocked through dual 64 stage delay line U105, using the squared output of U103 as a clock. U105 is preferably operated at a slightly higher voltage (+8 V) to ensure fast transition times. This produces the required exemplary 64 bit delay. The outputs of the shift register are gated back into 1.544 mHz pulse trains by ANDing them with the inverted clock signal in U107. This recreates the original input excursions, delayed by 64.5 clock periods.

The delayed negative +bit and −bit pulses are passed througu 4 bit-by-two input data selector U108. This IC acts as the break relay, passing either the delayed input (NO ACCESS and MONITOR modes) or a signal from the LINE BUS (SPLIT modes).

The two outputs of the data selector are combined in dual driver U111 and coupled out through transformer T103 to reproduce, delayed, the original bipolar input signal (or a substituted signal coming from the LINE BUS).

ACCESS BUS INPUT/OUTPUT CIRCUITS

The two busses (LINE and EQUIPMENT) preferably have idential I/O circuits, consisting of one fixed output pair and one reversible pair each. The fixed output pair preferably provides undelayed signal output from the corresponding DS1 input, while the reversible pair provides delayed output from, or delayed input to substitute for, the corresponding DS1 output. The direction of signal flow in the reversible pair is determined by relays K3 and tri-state buffer U28. These components route the signal through either input circuits U26 and U27 or output circuits U29 and U30. These circuts operate identically to the corresponding circuits in the digroup delay and access circuitry described above. Both reversible outputs are switched together, and preferably always face in the same direction.

In some systems the outputs of the access busses may be wired in parallel with other SST-Class Access Cards. This requires that inactive cards be removed from the bus. This is done by relays K1 and K2, which open and close together in response to a specific command.

DECODER AND DRIVER CIRCUITRY

Figure 10A:
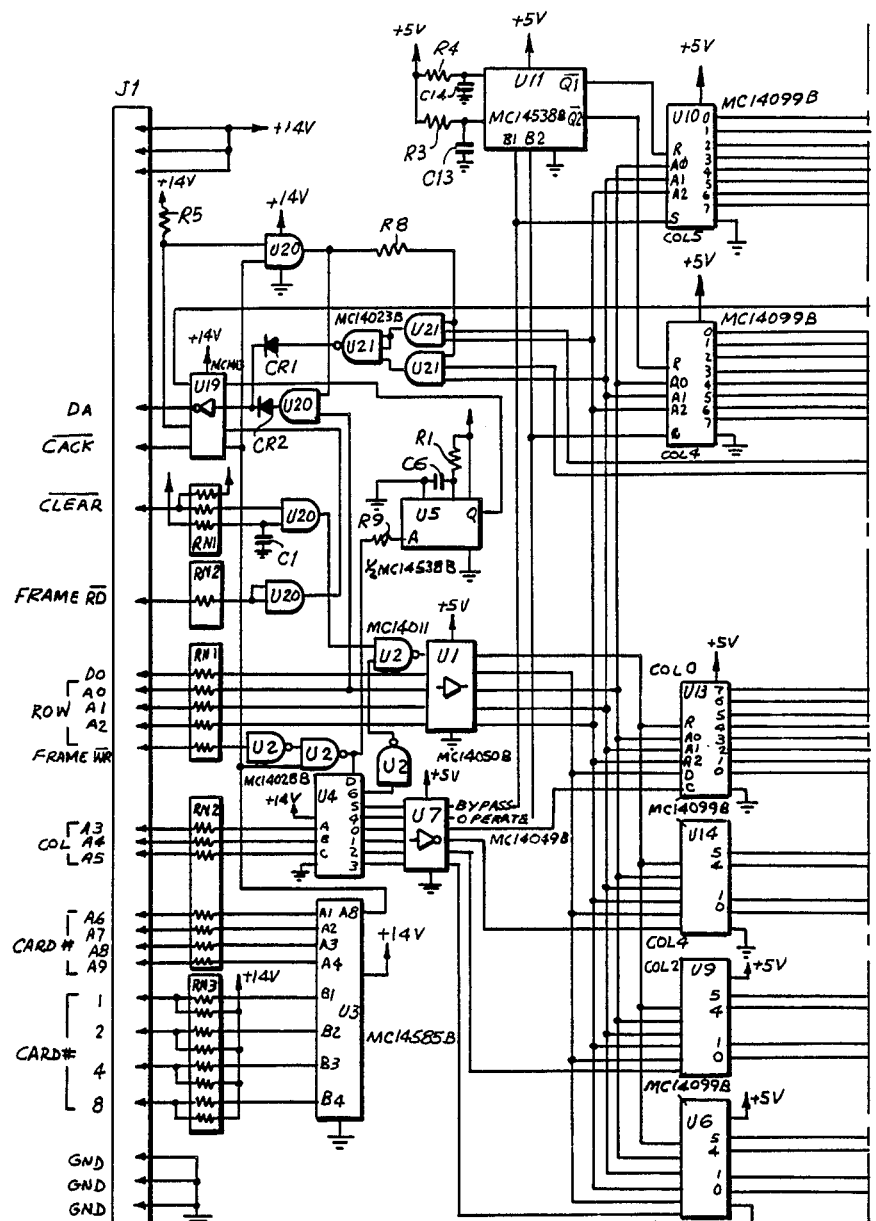
FIGS. 10A and 10B taken together comprise a schematic diagram of the decoder portion of the access card of FIG. 3.
Figure 10B:
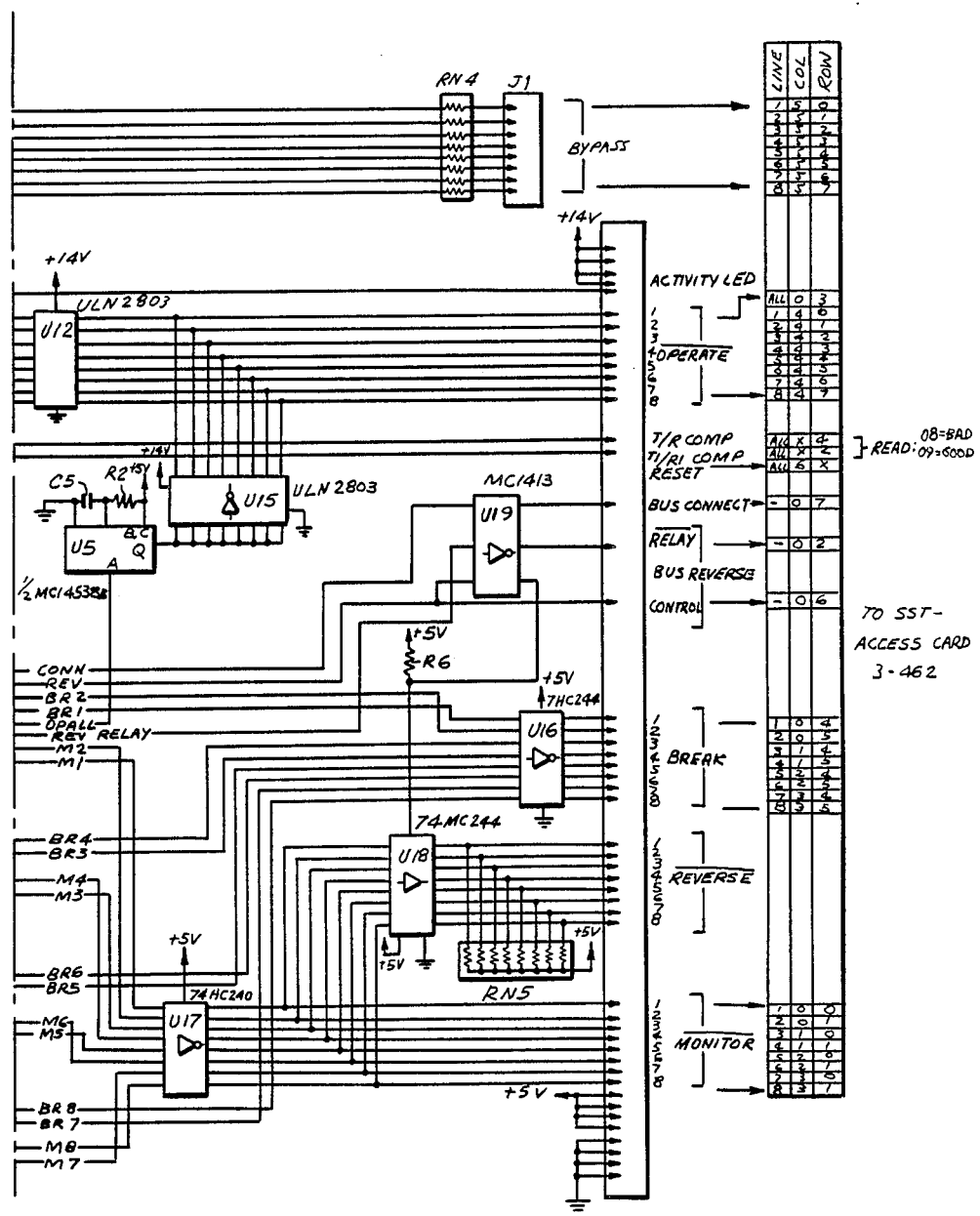

Referring now to the schematic of FIGS. 10A and 10B, the decoder and driver circuitry associated with the access card 106 is shown. All actions on the card are controlled by a parallel control bus, which derives its signals from the system control bus via a decoder located in the frame. The control bus preferably carries three addresses: Column (0–3), Row (0–3) and Card (0–15). There are several other signals on this bus, of which five are used: Read, Write, Data Out, Data in and Card Acknowledge.

BYPASS RELAYS are provided to protect service in the event of power loss or the failure of any or all of the digroup logic circuitry. These relays, one for each digroup, are preferably automatically placed in the BYPASS position when the card is de-energized, and are placed in the OPERATE position on command from the controller when power is applied to the system. To minimize system power consumption, latching relays are used, and on-card circuitry is provided which automatically places them in the bypass position on power failure. Thus, in the event of power loss the relays return to their BYPASS position, restoring the through path for the digroup and remain so when power is restored, until commanded to insert the logic circuitry. If a card is unplugged for any reason it will also automatically revert to the bypass position.

The relays can also be placed in the bypass position on command, so any digroup can be bypassed in the event of logic failure. Since bypass removes the fixed delay built into the SST-Access card 106, a frame hit will occur each time a digroup is bypassed or reinserted. By way of example, the circuitry that operates the relays functions in the following manner:

The latching relays used are operated by two electrically independent coils, one for each position of the relay (bypass coil and operate coil). A short (approx 5 millisec by way of example) pulse on either coil sets the relay to the corresponding position.

On initial power up the PILOT RELAY is de-energized, grounding the bypass coil power leads of the BYPASS RELAYS. All the energy storage capacitors are therefore discharged (via their corresponding coil resistance). When the power supply reaches its "must operate" voltage, the PILOT RELAY closes, transferring the bypass coil power to the power supply. The storage capacitors then charge up through the bypass coils, ensuring that sufficient energy is stored to transfer the BYPASS RELAYS to the bypass position should the power fail (or the card be unplugged). The BYPASS RELAYS are initially in the bypass state as the result of the last power failure (or deliberate disconnection).

When the card is operating under stable power conditions the storage capacitors are fully charged and the bypass coils of the BYPASS RELAYS are returned to the power supply via the PILOT RELAY. Thus, no current is flowing through the bypass coils, and the controller is free to place the BYPASS RELAYS in either state by pulsing either the operate or bypass coil of any relay for approximately 5 milliseconds, by way of example, with the control transistors.

When power fails the voltage falls and the series charging diode becomes reverse biased, maintaining the charge on the energy storage capacitors. When the voltage falls below the must open voltage of the pilot relay (for example, less than 5 volts), the pilot relay transfers the bypass coil returns to ground. The energy storage capacitors then discharge through the bypass coils, placing the BYPASS RELAYS in their bypass state. Since they are latching, they remain in this state when the power is reapplied.

SSTCB TEST LINE CARD

Preferably, the functions of the SSTCB test line card 108 are as follows:

1-Interconnect two adjacent test ports to either a single drop and insert test set 102 or to two conventional terminating DS1 test sets 102.
2-For conventional test sets 102, provide disconnect of the transmit side in MONITOR mode to prevent contention.
3-For conventional test sets 102, provide reversal of inputs in MONITOR mode, so that both sides of the digroup can be monitored.
4-For conventional test sets 102, provide reversal of inputs in SPLIT modes, so that the signal flow directions are correct.
5-For conventional test sets 102 provide idle code or other special code transmission to the unused transmit of the digroup in the split mode.
6-For drop and insert test sets 102, when used with T-Access cards, provide synchronizing connections and signal frogging to insert the set correctly in both DSls.
7-For drop and insert test sets 102, when used with SST-Access cards, provide adjustable delay in the test outputs, signal comparators to check the delay and signal frogging to insert the set correctly in both DSls.

The SSTCB card 108 may be connected to any pair of adjacent ports in the SST-Class system. The lower numbered port is preferably odd. For this reason, the schematics and block diagrams designate the ports 'N' and 'N+1'. Each port consists of two two-wire pairs T/R and T1/R1.

As shown and preferred, there are two identical delay circuits, one for each port. Since they are the same, only the one for Port N will be discussed. The DS1 output of the drop and insert test set 102 is demodulated by U2 into +bits, −bits and clock. The +bits and −bits are then clocked through adjustable shift registers U67 and U7. The number of stages of these registers is set (from 1 to 64) by the binary number present on the six delay control lines. The outputs of the delay lines are reformed into pulses by combining them with the clock square wave in U9. To provide vernier delay, the clock is passed through tapped active delay line A1 and the required delayed signal selected by data selector U10. The resultant output is regenerated into bipolar data for output by U1.

When the SST-Class is used to split a digroup, one send from the SST-Class system (to either the equipment or the line) is always unused. If it is not made busy or idle it will generate an alarm. T-Class does not address this problem. SST-Class has the capability, under conventional software control, to send any one of four codes on the unused line, or to quit terminate it. Two of the codes are fixed: Type 1 (consecutive all ones) and Type 2 (superframe synch bits embedded in all ones). The other two can be specified by the customer. Since all the codes are in EPROM, they can be changed as required and different SSTCBs, even in the same system, can have different codes resident in their EPROMS (possibly depending on the type of test set 102 they feed). Since sending code requires bringing down the other side of the split DSl, both ports on the SSTCB are used, and only one test can be conducted. Therefore, a single code generator 124 is preferably provided, and can be connected as needed via relays.

The code generator 124 is preferably equipped with two EPROMs and a circuit which clocks 8 bit words out of one of them sequentially in order of increasing address until reset to address zero by a bit in the output word, whereupon the clocking sequence repeats itself. Programming the generator 124 consists of conventionally programming the two EPROMs so that the sequence of words produces a complete superframe (or extended superframe) with the desired bit sequence.

In summary, FIG. 1 illustrates the signal flow in the system 100 of the present invention by arrows for each of the illustrated line pair directions, each of which has its own associated test set insertion switch 150, 152 respectively, for the synchronization function, with switches 150 and 152 being open at this time. FIG. 2 illustrates the signal flow in the same manner for the actual test function after synchronization has been satisfied and the test set insertion switches 150, 152 have been closed to insert the test set 102 into the telephone line for actual testing. It should be noted in FIG. 2 with switches 150 and 152 closed the signal does not pass directly through the respective fixed reference delays 110 and 112, respectively, as in FIG. 1, but rather passes through the test set 102. The fixed reference delay 110, 112 is always in the signal path and the variable delay 120, 122 is in the test path and is varied so that the sum of the variable delay 120, 122 and the test set 102 delay equals the fixed reference delay 110, 112.

Thus, by utilizing the presently preferred system 100 of the present invention, a conventional test set may be inserted into a telephone line without interrupting the timing on the line and without disturbing other customers on the line.

What is claimed is:

1. In a remote test access system for remotely testing an accessed telephone ine, said system comprising a telephone test set having an associated test set delay time, and a test set insertion switch means having a test path position and a normal signal path position for switchably inserting said test set into said telephone line in said test path position, said telephone line forming a test path through said test set when said test set is switchably inserted into said telephone line in said test path position and a normal signal path when said test set is switchably disconnected from said telephone line in said normal signal path position, said test set providing an actual test signal over said telephone line through said test path when said test set is switchably inserted therein in said test path position; the improvement comprising means operatively connected to said test set insertion switch means for providing a common fixed reference delay for said telephone line in both said normal signal path position and said test path position, said fixed reference delay providing a fixed delay time for all signals passing over said telephone line, and variable delay means operatively connected to said test set insertion switch means in said test path position for providing a delay for said test signal passing through said test path, said variable delay means comprising means for varying the delay time associated with a signal passing therethrough for providing a varied delay value capable of providing a matching between said fixed reference delay and the sum of said test set delay associated with the test set inserted in said delay line and said variable delay means varied delay, value, said variable delay means delaying said actual test signal passing through said variable delay means in accordance with said varied delay value of said variable delay means; whereby a test set may be inserted into an accessed telephone line without interrupting the timing on the telephone line for providing errorless testing on said telephone line.

2. The improved remote test access system of claim 1 wherein said means for varying the delay time associated with said variable delay means further comprises comparator means for comparing the delay of a reference signal passing through said variable delay means with said telephone line uninterrupted with said delayed test signal provided from said test set until said variable delay means is at said varied delay value, said varied delay value being varied in accordance with changes in the associated test set delay time of the test set inserted into said accessed telephone line by said test set insertion switch.

3. The improved remote test access system of claim 2 wherein said remote test access system is a digital remote test access system, said test set being insertable into said telephone line test path without introducing bit errors on the accessed telephone line.

4. The improved remote test access system of claim 1 wherein said remote test access system is a digital remote test access system, said test set being insertable into said telephone line test path without introducing bit errors on the accessed telephone line.

5. the improved remote test access system of claim 1 wherein said system further comprises a polarity reversal means operatively connected to said variable delay means in said test path, said test signal having a normal polarity, said polarity reversal means comprising means for reversing the polarity of the test set signal when the polarity of said test signal is reversed from said normal polarity; whereby said polarity reversal means and said variable delay means enable compensation for the substitution of a plurality of different test sets in said test path.

6. The improved remote test access system of claim 5 wherein said means for varying the delay time associated with said variable delay means further comprises comparator means for comparing the delay of a reference signal passing through said variable delay means with said telephone line uninterrupted with said delayed test signal provided from said test set until said variable delay means is at said varied delay value, said varied delay value being varied in accordance with changes in the associated test set delay time of the test set inserted into said accessed telephone line by said test set insertion switch.

7. The improve remote test access system of claim 6 wherein said remote test access system is a digital remote test access system, said test set being insertable into said telephone line test path without introducing bit errors on the accessed telephone line.

8. The improved remote test access system of claim 1 wherein said variable delay means comprises a removable plug-in line card.

9. The improved remote test access system of claim 8 wherein said fixed reference delay means comprises a separate removable plug-in line card.

10. The improved remote test access system of claim 8 wherein said means for varying the delay time associated with said variable delay means further comprises comparator means for comparing the delay of a reference signal passing through said variable delay means with said telephone line uninterrupted with said delayed test signal provided from said test set until said variable delay means is at said varied delay value, said varied delay value being varied in accordance with changes in the associated test set delay time of the test set inserted into said accessed telephone line by said test set insertion switch.

11. The improved remote test access system of claim 10 wherein said remote test access system is a digital remote test access system, said test set being insertable into said telephone line test path without introducing bit errors on the accessed telephone line.

12. The improved remote test access system of claim 11 wherein said fixed reference delay means comprises a separate removable plug-in line card.

13. The improved remote test access system of claim 10 wherein said fixed reference delay means comprises a separate removable plug-in line card.

14. The improved remote test access system of claim 8 wherein said system further comprises a polarity reversal means operatively connected to said variable delay means in said test path, said test signal having a normal polarity, said polarity reversal means comprising means for reversing the polarity of the test set signal when the polarity of said test signal is reversed from said normal polarity; whereby said polarity reversal means and said variable delay means enable compensation for the substitution of a plurality of different test sets in said test path.

15. The improved remote test access system of claim 14 wherein said removable plug-in line card further comprises said polarity reversal means.

16. The improved remote test access system of claim 15 wherein said fixed reference delay means comprises a separate removable plug-in line card, said separate removable plug-in line card comprising said comparator means.

* * * * *